United States Patent [19]
Ericsson et al.

[11] Patent Number: 5,438,958
[45] Date of Patent: Aug. 8, 1995

[54] PLATFORM SUPPORTED MARICULTURE SYSTEM

[76] Inventors: John D. Ericsson, 3462 Sycamore La., Gulf Breeze, Fla. 32561; John R. Boad, 102 Grand Heron Dr., Panama City Beach, Fla. 32417

[21] Appl. No.: 189,335

[22] Filed: May 18, 1994

Related U.S. Application Data

[63] Continuation-in-part of Ser. No. 15,484, Nov. 18, 1993.

[51] Int. Cl.$^6$ ............................................. A01K 63/00
[52] U.S. Cl. ................................................... 119/223
[58] Field of Search ...................... 119/208, 223, 239

[56] References Cited

U.S. PATENT DOCUMENTS

| | | |
|---|---|---|
| 4,257,350 | 3/1981 | Streichenberger . |
| 4,266,509 | 5/1981 | Gollott et al. ........................ 119/208 |
| 4,312,296 | 1/1982 | Stelleman et al. . |
| 4,335,680 | 6/1982 | Kipping . |
| 4,380,213 | 4/1983 | Blair et al. ............................ 119/223 |
| 4,610,219 | 9/1986 | Morimura ............................ 119/223 |
| 4,716,584 | 1/1988 | Bourden . |
| 4,798,169 | 1/1989 | Rosén et al. .......................... 119/223 |
| 4,909,186 | 3/1990 | Nakamune . |
| 4,936,253 | 6/1990 | Otamendi-Busto . |
| 4,957,064 | 9/1990 | Loma . |
| 5,095,851 | 3/1992 | Bourg .................................. 119/223 |

FOREIGN PATENT DOCUMENTS

| | | | |
|---|---|---|---|
| 2565463 | 12/1985 | France ................................. 119/223 |
| 8704590 | 8/1987 | WIPO .................................. 119/223 |

*Primary Examiner*—Robert P. Swiatek
*Attorney, Agent, or Firm*—Joseph T. Regard, Ltd.

[57] ABSTRACT

The preferred embodiment of the present invention teaches an open water mariculture facility wherein there is provided a central platform/support structure from which uniformly emanates a plurality of elongated, generally cylindrically configured, ballastable cage structures for containing and maintaining a marine species. The present system contemplates ballastable cages, which can be raised for maintenance operations. In one maintenance operation, the cages are partially exposed out of the water for the maintenance of the cage walls; the system further provides a rolling system for turning the cages on demand, for out of the water maintenance of all portions of the cage wall, without the necessity of lifting the cages from the water. An alternative system of the present invention contemplates the conversion of abandoned oil platforms for use as the central platform/support structure, providing a central support structure for an array of cages.

24 Claims, 7 Drawing Sheets

PLATFORM SUPPORTED MARICULTURE SYSTEM

The present application is a continuation-in-part of U.S. Des. patent application Ser. No. 29/015484 filed Nov. 18, 1993, naming as the inventor John D. Ericsson.

BACKGROUND OF THE INVENTION

1. Invention Field

The present invention relates to mariculture systems, and more particularly to an ocean farming system suitable for raising a variety of marine species, including, for example, Redfish and other finfish, shellfish or the like. The preferred embodiment of the present invention teaches a structure wherein there is provided a central platform/support structure from which uniformly emanates a plurality of elongated, generally cylindrically configured, ballastable cage structures for containing and maintaining the farmed species.

The present invention as implemented teaches a structure particularly suitable for use in open water, as the structure is configured to withstand severe storms; in fact, computer simulations have indicated that the preferred embodiment of the present invention is capable of withstanding the 100 year tropical storm.

In addition to strength, the present system is configured to allow continued presence of workers and/or researchers for monitoring and maintaining the farm, via a complete support facility on the main platform, as well as providing automated systems for monitoring the crop, as well as providing optimal environmental control including not only feeding, but oxygenation and monitoring for and controlling bacteria and other conditions via dispensing medications or the like.

The present system contemplates ballastable cages, which can be raised for harvesting or maintenance operations. In one maintenance operation, the cages are partially exposed out of the water for the maintenance of the cage walls, including cleaning and allowing UV exposure of algae and the like thereon; the cages further contemplate a rolling system for turning the cages on demand, for out of the water maintenance of all portions of the cage wall, without the necessity of lifting the cages from the water, and without the necessity of having to remove the crop therein.

While the present system may be fabricated on site, or prefabricated and installed where desired, an alternative system of the present invention contemplates the conversion of existing production or like commercial oil platforms, including offshore platforms, for use as the central platform/support structure, providing a central support structure for an array of cages as contemplated in the preferred embodiment of the present system. Thus, this alternative system contemplates a new and innovative system for retrofitting and convening unused or abandoned open water platforms from an ecological blight to a revenue and resource generating, ongoing endeavor.

2. General Background Discussion

While mariculture, fish cages, and similar structures have existed for centuries, none contemplate of suggest a large scale system comprising a centralized, main platform having a work area thereon, said platform having uniformly emanating therefrom at its base a plurality of ballastable or non-ballastable, elongated fish pens. Not only does the system contemplate a unique and uncontemplated efficient system for large scale mariculture production, it also provides an open water structure capable of withstanding heretofore devastating storm conditions.

A list of prior patents which may be of interest is presented below:

| U.S. Pat. No. | Patentee(s) | Issue Date |
|---|---|---|
| 3,495,562 | Fahlman et al | Feb 17, 1970 |
| 4,186,532 | Kahn | Feb 05, 1980 |
| 4,257,350 | Streichenbrgr | Mar 24, 1981 |
| 4,266,509 | Gollott et al | May 12, 1981 |
| 4,312,296 | Stelleman et al | Jan 26, 1982 |
| 4,610,219 | Morimura | Sep 09, 1986 |
| 4,335,680 | Kipping | Jun 22, 1982 |
| 4,716,854 | Bourdon | Jan 05, 1988 |
| 4,798,169 | Rosén et al | Jan 17, 1989 |
| 4,909,186 | Nakamne et al | Mar 20, 1990 |
| 4,936,253 | Otamendi-Bust | Jun 26, 1990 |
| 4,957,064 | Koma | Sep 18, 1990 |
| 5,095,851 | Bourg | Mar 17, 1992 |

U.S. Pat. No. 5,095,851 issued 1992 to Bourg illustrates in its exemplary embodiment a converted hopper barge for mariculture operations, the system teaching a mariculture system including liquid oxygen or compressed air infusion via pipes or the like into the fish habitat, as well as a means of varying the water line of the vessel.

U.S. Pat. No. 4,957,064 issued 1990 teaches an "Offshore Fish Cage for Farming Fish" on the open sea wherein the upper portion of the cage is above water level; this apparatus is distinguishable from the present invention, however, it is nonetheless pertinent as the "Background of the Invention" section (col 1) recognizes a method of floating a fish cage at the surface during normal operation, and sinking same during rough seas.

U.S. Pat. No. 4,936,253 issued 1990 for a "Marine Fish Farm" teaches a mariculture system wherein there is included a maintenance and personnel platform in communication with at least one ballastable, rigid barrel-type cultivation cages.

U.S. Pat. No. 4,909,186 teaches a large scale "Fish Cage for Cultivating Fish" wherein there is provided an open hull vessel forming a fish cage via the inclusion of screens over the open areas; the vessel is able to remain afloat via the inclusion of ballast tanks arranged on the upper side and outer side platings, configured to hold air.

U.S. Pat. No. 4,716,854 to Bourdon teaches a "Sea Aquaculture Installation" teaching a main platform for personnel and maintenance with separate, removed, floating habitat modules, said modules providing food and air on demand via fluid conduit from said platform.

U.S. Pat. No. 4,312,296 issued 1982 comprises one of the more pertinent references found during the course of the search, teaching a floating fish cage having ballast tanks located at both ends, at least one of the cages having means of varying the buoyancy of the cage, an axle running along the longitudinal axis of said cage, and rotation means for rotating said cage about its axis. (FIGS. 5, 6)

Lastly, U.S. Pat. No. 3,495,562 teaches an underwater habitat wherein there is provided a ballastable system which may be of some general pertinence to your structure.

As may be discerned by a review of the above and foregoing, it is submitted that the prior art has yet to contemplate or suggest an effective system for large scale mariculture, providing a cost effective, yet sustainable and lasting system based in the often inhospitable open water environment. Instead, the prior art tends to contemplate either systems having limited, specialized production characteristics, or unworkable, expensive larger scale systems.

SUMMARY DISCUSSION OF THE INVENTION

The present invention overcomes these prior art problems by providing a system which is particularly configured for large scale, open water mariculture, teaching a system which supports mariculture from introduction to harvesting in an habitat which can survive even severe weather conditions.

The present invention contemplates a unique system for mariculture which incorporates an offshore tower (which may or may not be ballastable) and an array of surrounding elongated fish cages. The system is designed to provide the facilities to initiate and grow saltwater finfish or shellfish within their natural environment. The system is designed to be friendly to the environment, and to withstand the 100 year tropical storm. It is to be self sufficient in that it can operate for a period of time without shoreside support.

Further, the present system is designed to provide facilities for a hatchery, to provide young fish to the farm for cultivation. Facilities are included to raise fingerlings to junior size fish, for further transfer and cultivation to adult fish. Unique concepts have been incorporated into the fish cages, as well as the system to contain, protect and transfer the fish from one cage to another, and to provide food and aeration to the fish on an automated basis.

The fish cage arrangement contemplates a central support tower or platform of concrete, concrete and steel, or the like resting on the sea bottom in 45 to 50 feet of water, more or less, with a plurality of laterally situated, spaced elongated fish cages emanating therefrom. These cages could provide a total volume of 1,000,000 or more cubic feet of fish containment, and an existing system could be expanded in future designs to longer or wider cages, or to additional units, which may linked end on end via umbilical conduits.

The cage of the present invention is contemplated as being generally cylindrical in configuration, and is built to roll over in a controlled manner as required. Ballast tanks, or multi-compartmented ballast pontoons at each end of the tanks may have a circular, octagonal, or even square cross sectional configurations, with one or more ballast tanks provided in each pontoon to control the depth and position of the fish cage.

As contemplated, each pontoon will be configured so that ballast water will be distributed around the cage in such a manner that the center of gravity of the cage will be in close proximity with the center longitudinal axis of the cage, By selectively flooding the cages ballast tanks, the cage walls will be positioned for cleaning the cage exterior, or the service pipe will be exposed, for fish harvesting or service purposes.

Further features of the exemplary embodiment of the present invention are presented infra.

The cage walls could be integral with the cage frame, with the cage screen being attached to the frame; the exemplary embodiment of the present invention, as discussed infra, discloses a spiral or helical configured tubing structure to add better containment, strength, stability and buoyancy to the present cage construction.

In addition, the containment wall of the cage could utilize screen wire, or other materials such as plastic fiber, a spiral wound tube, or fish net as appropriate.

In an exemplary embodiment of the present invention, the cages could be, for example, 140 long, inside dimension, plus the ballast tanks at each end. The length is not critical to the design, and simply controls the cage volume. Longer or otherwise larger cages can be built within the concept.

The maximum diameter of the containment wall of the exemplary embodiment of the cages of the present invention would be forty feet, for the exemplary application, that is, for use with a water body having about a fifty foot depth. This dimension was utilized only because of presumed water depth, and not for any other reason. By limiting the diameter to 40 feet, the depth of the water will allow the top of the cages to rest at least 10 feet beneath the water surface during mean low tide in case of a tropical storm. The connecting structure between the pontoons could consist of structural steel tubing, configured so that the resulting structure is light in weight, and meets structural strength requirements.

Pontoon plating and stiffeners could be sized to meet the scanting requirements of barges in ocean service, as incorporated into structure design by American Bureau of Shipping criteria. The plating is sized to withstand the sinkage of any compartment into 50 feet of salt water, without permanent deformation of the plating. This will allow the cage to be placed on the sea bottom during the occasion of a tropical storm.

The screen retention scheme is devised to retain the product fish within the cage, while preventing predator fish from entering the cage. The screen, or net, will be installed covering the cage area. Depending on the type of net, this may be installed in two layers to prevent product loss. Inside the screen, installed spirally wound or longitudinally on 6, 12, or 24 inch centers circumferentially around the periphery of the cage, could be high strength plastic tubing, pvc or plastic rods, or the like.

Fiberglass rods may be situated longitudinally over the entire length of the barrel cages, and provides support to the net screen and the product fish. They will also act as bars, preventing large bodies, or predators from entry.

Attendant entry into the cage will be at one or more points in each cage section. The entry could be fitted with a recloseable opening in the net screen and fiberglass rods. This opening will be provided with a ladder to allow personnel access to the longitudinal center pipe.

Each cage could be fitted with a longitudinal service pipe on the centerline of the cage. This pipe will provide some longitudinal strength, as well as support for services to be installed in the unit. The pipe may be sealed so as to provide buoyancy to the system, and is also configured to provide a passageway or conduit for the various support systems, including the oxygenation lines, feeder tubes (which would extend from the service tube in each partitioned area of the cage, suction lines for harvesting and transfer of fish, and ballast control lines, for providing pressurized air or fluid to the ballast tanks. Further, a platform or walkway may be installed on the "top" of the centerline longitudinal service pipe. This platform is intended to allow the attendant to stand in the cage during fish transfer operations.

As indicated above, food for the product fish could be supplied to the cages through piping installed within the center service pipe, via an automatic feeding system from the tower. This food will be stored within the main support tower. Piping systems will be connected to each cage. The food will be delivered to the cage in a slurry type mixture suited for the fish resident within the cage. Connections from the tower to the cage could consist of, for example flexible hose.

In the exemplary embodiment of the present invention, each cage could be equipped with a fish aeration system. This installation is to insure the proper circulation of the sea water, and to insure adequate oxygen content in all local conditions.

For harvesting or transfer purposes, each cage could be equipped with a fish vacuum transfer system. The transfer lines will be installed within the cage center service pipe. The transfer lines will be connected with an installed system on the tower. The vacuum transfer system will introduce the fish into the pipe through an induced vacuum, and deliver the fish to a cage on the tower. From the tower cage, the fish can be transferred to another cage, or to a boat for disposition.

Fish will be trapped into the fish vacuum transfer system in a unique manner. In each cage section a vinyl sheet connected to a net (harvest net) will be installed, and normally kept in a stowed position on the center pipe. When desired, the cage will be rolled into the upright position. The cage will be deballasted so that the center pipe will be at the water surface. An attendant will enter the cage, and descend to the center service pipe platform. The harvest net is deployed so that it is attached to the outer surface, and to the center service pipe. The cage will then be rolled through a 180 degree arc, thereby trapping all of the fish in that cage. Each cage compartment has an access junction to the fish vacuum transfer system which a flexible hose can be attached. The attendant can then put the vacuum hose into the water where the fish are concentrated and vacuum them into the transfer system. Thus the fish, will enter the transfer system, for harvesting purposes or transferring them to other cages within the system.

The cage ballasting and rolling system is a unique design. When the cage is in empty/transit mode, the ballast tanks or pontoons will be dry. In this case the cage will float with an approximate draft of 11 feet, in the exemplary embodiment of the present invention. When the cage is in place, and fish production has commenced, the cage may be rolled via use of one of the platform supported cranes, or, in the alternative, pontoon design, specific compartments or tanks within each pontoon will be flooded. In said design, the two end pontoons could also be circular in configuration, as opposed to hexagonal as illustrated.

The cages of the present invention are configured to roll, for servicing and harvesting purposes. The preferred embodiment of the present invention, as discussed infra, teaches the utilization of a crane system for rolling the cages as needed. An alternative embodiment of the present invention contemplates the utilization of multi compartmented pontoons, each of which includes a plurality of tanks. Under this design, each of the pontoons could include 8 ballast tanks, which could be located in the pontoon at each end of the fish cage. In the exemplary embodiment of the present invention, the ballast tanks would be sized to provide sufficient buoyancy for the fish cage to float at a 35 foot draft when all ballast tanks are full. This will be known as the "operating condition".

The fish cages should be turned at regular intervals to place different sides of the cage into the atmosphere. This is intended to allow the attached plant and animal growth and entangled debris and the like to be removed on an almost daily basis. As discussed above, the preferred embodiment of the present invention teaches that the fish cage in the preferred embodiment of the present invention may be turned through the use of a tower crane, lifting on a padeye on the pontoon, thereby rolling the cage. Since the fish cage will be connected to the tower with service lines as well as a mooring system, it is intended that the cage be designed to roll 180 degrees in each direction of the center position.

The operation of the fish cage to harvest or transfer fish will require the removal of ballast water. The cage will be placed in the center equilibrium position. About half of the water in the end ballast tanks will be ejected via pressurized air from the support platform via the center service tube. The tanks to be dewatered will be equally dispersed about the center line of the fish cage so that the center of gravity of the entire assembly will remain in close proximity to the center line. The ballast tanks will be sized to insure that the dewatering will raise the cage so that the center pipe will be at or above the water.

The cage may be rolled during fish harvesting or transfer operations by attachment of a crane to a padeye on the fish cage, and lifting that side of the cage, causing the structure to roll, as discussed supra. Since the center of gravity of the structure, including ballast water will be on the centerline of the cage, any position reached will be an equilibrium position. Repeat lifting will roll the cage to the desired position.

Deballasting operations can be performed by any of several methods. The ballast tanks will be fitted with air line connections for pressurizing said tanks with compressed air from the system installed on the tower. Each tank may be fitted with a pressure relief/discharge valve through which the water will be discharged by the compressed air pressure. Further, said tanks may be flooded by opening an installed valve allowing sea water to enter the cage, while air is vented through the installed relief/discharge valve.

The mooring system will consist of a cable from the tower to a cable swivel attached to cables to the ends of the center service pipe, which acts as an "axle" for the barrel cages system, as well as to the sides of the fish cage, at the tower end. A similar arrangement will be installed at the seaward end of each fish cage. The seaward end of the mooring wire from the swivel will attach to a large mooring buoy. This buoy, in turn, will be attached to a set of anchors to maintain the position. Thus the system will be flexible to withstand the normal currents encountered, and it will be rigid for the unusual circumstances, short of major storms.

In the case of a major storm, the barrel cage system is designed to be placed in a safe condition. The fish cage will be submerged so that it will rest hard on the bottom of the Gulf. The surface of the water above the cage will be at least 10 feet above the upper extremity of the cage. This should provide sufficient water so that the running sea, although it may uncover the top of the cage, will not be sufficient to cause damage or dislocate the cage.

The cage is submerged through the flooding of the ballast tanks, via, for example, water pumped to said tanks through the central service pipe, from the central support platform. Note that prior to the storm condition, the cage will be floating in the operating condition. The cage will be placed in the upright position, In the multi-compartmented ballast pontoon embodiment, the tank voids in the pontoon that are not used to ballast the cage down to the operating position will be connected together through a piping system.

By opening a valve on one end of the cage, all of these tank voids will be allowed to flood. In the preferred embodiment, the ballast tanks at each end of the cages are single, unitary tanks, and not multi-compartmented, so they would merely be flooded, venting the air therein. The cage will rest upon the sea bottom, where said cable connections to the tower and sea bottom are tightened, to maintain positioning of the cages on the sea floor. After the storm condition passes, the cage will be raised. This will be accomplished by closing the valve which allowed the voids to flood. Then the compressed air system will be activated to the ballast tanks, causing them to de,salts as described above. Then water will be blown out of the tank voids in the same manner, and the cage will then be returned to the operating condition.

An alternative system of the present invention contemplates the conversion of existing production or like commercial oil platforms for use as the central platform/support structure, providing a central support structure for an array of cages as contemplated in the preferred embodiment of the present system. Thus, this alternative system contemplates a new and innovative system for retrofitting and converting unused or abandoned open water platforms from an ecological blight to a revenue and resource generating, ongoing endeavor.

It is thus an object of the present invention to provide an open water mariculture system having a central support platform structure having laterally emanating therefrom a plurality of elongated, generally cylindrical cages.

It is another object of the present invention to provide a mariculture system which is sustainable in severe storm conditions in open water.

It is still another object of the present invention to provide a mariculture system wherein there is provided a plurality of independently ballastable, elongated containment cages which may each independently be raised to the water surface such that a portion of said cage wall penetrates the surface, such that said exposed portion may be cleaned or otherwise serviced, and wherein said cages further include means to independently rotate each of said cages to selectively expose a portion of said cage wall out of the water.

It is another object of the present invention to provide a mariculture system wherein there is provided a central control/support platform, configured to provide quarters for the crew and support for the crop, from hatching to food processing, monitoring, and harvesting of said crop.

Lastly, it is an object of the present invention to provide a system for converting an offshore production platform for use as a support structure for an open water hatchery, supporting a plurality of elongated, elongated cages generally uniformly emanating from said support structure, forming an effective and sustainable mariculture containment array.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
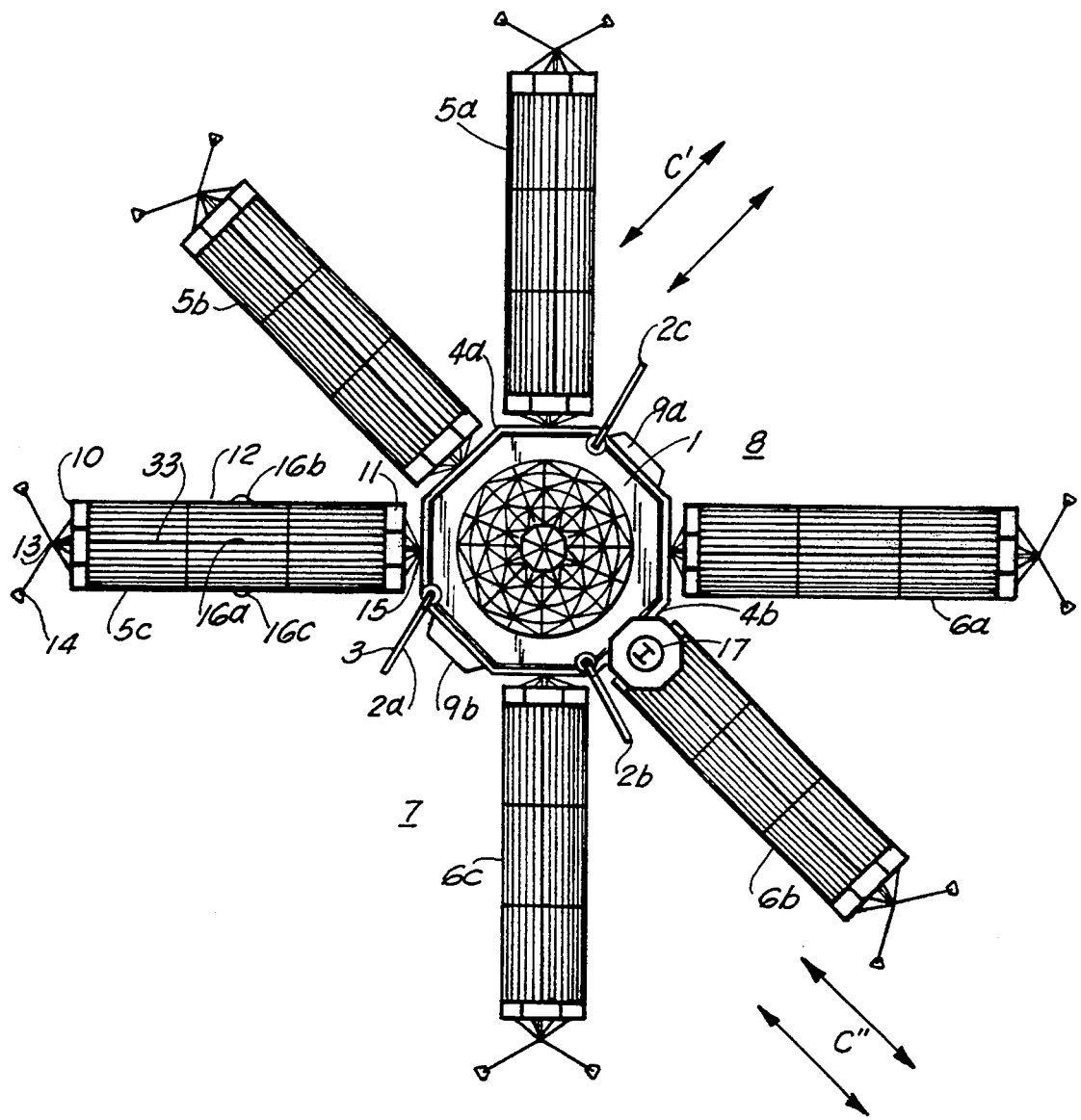
FIG. 1 is a top view of the preferred embodiment of the Platform Supported Mariculture Array of the present invention, illustrating the central support platform of the present invention, and the barrel cages emanating therefrom.

As can be seen in FIG. 1, the open water mariculture system of the preferred, exemplary embodiment of the present invention, includes a central support platform 1 configured to be situated upon a water bottom, the platform having thereon an elevated, upper level whereon there is provided telescoping cranes 2a, 2b, and 2c, said cranes having telescoping booms 3, the placement and operation of which will be detailed further in the application.

Laterally emanating from first 4a and second 4b sides of the support platform 1, respectfully, are first 5a, 5b, 5c and second 6a, 6b, and 6c underwater cage arrays, each of said cage arrays comprising an elongated, cage structure generally uniformly spaced relative one another in their respective array, forming open spaces 7, 8 between the two arrays. Boat docks 9a, 9b are provided between the open spaces, respectively. As shown, the cage arrays are preferably configured in a generally lateral position relative the prevailing current C', to allow for maximum water circulation through the cages and allow for safer docking procedures, as the in docking procedure would allow for the current being directly lee to the vessel.

In an alternative placement of the cages, in higher current C" areas, the cages would be situated such that their longitudinal axis would be in general alignment with the current, providing a stronger configuration with less stress on the overall system. The present system is somewhat flexible with regard to placement of the cages, as prevailing currents change with seasons and weather conditions, so the placement of the first and second cage arrays are not static, and can vary as needed.

For example, a positioning of the cages can be varied in preparation for a tropical storm or the like, anticipating the path of the storm, and aligning the first and second cage arrays in longitudinal alignment with the anticipated current flow, lowered and anchored to the bottom. It is also noted that in extreme conditions, the cages may be lashed end to end and longitudinally aligned with the current flow and lowered and anchored to the bottom, providing minimum interference with said flow and thereby avoiding damage to the system.

As shown, each cage 5a–c, 6a–c, has an outer 10 and inner 11 end, respectively, relative to the support platform 1, and a containment area 12 therebetween for containing a mariculture species to be raised, for example, Redfish, Mahi Mahi, Shrimp or the like. As shown, in the preferred embodiment, the cages in their respective arrays are closer to one another at their inner ends, and father apart at their outer ends, thereby lessening current flow in the vicinity of the central support platform, making maintenance of the cages easier in rough seas.

In the preferred embodiment of the present invention each cage would be of a generally cylindrical, elongated construction, with the containment area being a generally open area surrounded by a fluid permeable, containment wall such as a plastic or wire grid or the like, with a service pipe 33 having a walkway thereon running the length of the longitudinal axis of said cage, and the respective ends 10, 11 of the cage having affixed thereto inner and outer anchor lines 13, 15, respectively, the outer line 13 affixed to an anchor 14 in the seabed, the inner line 15 affixed to the support platform. The cages would have a diameter ideally about 75–90 percent of the depth of the body of water in which they are situated, in order to maximize storage capacity and efficiency of operation.

Alternatively, the outer anchor line 13 could be supported by a buoy, which would in turn be anchored via line to the seabed, in order to support the outer end of the cage in the desired position.

As further shown, generally medially situated relative the two ends of the cage are padeyes 16a–c, affixed to said cages at spaced intervals about the medial area of the cages, for moving and turning said cages as will be further discussed infra. Also illustrated in FIG. 1 is a helicopter pad 17, the most desirable method of transporting people and lighter material to and from open water destinations.

In the exemplary embodiment of the present system, which is in about 50 feet of water, each barrel cage would be about 160 feet long, 40 feet in diameter, and should be capable of holding up to about 250,000 fish to market size, including, for example, Redfish, Mahi-Mahi, or the like, which can be grown from a fingerling to about four pounds in about 150 days. Further, the exemplary embodiment contemplates three segregated compartments in each cage, for separating the juvenile fish from the more fully grown fish. As the fish grow, they may be sorted by size and transported via water vacuum to the other cages, where they may be grouped by size for further feeding, until final harvesting.

FIG. 2 illustrates a side view of the present invention, showing the various levels of the support platform 1, its structural relationship with the cages, and the overall system environment and layout relative the water body in which it is situated, which, for exemplary purposes, comprises a 50 foot depth. An ideal water bottom would be somewhat firm and not rocky, with preferably water having good visibility.

As shown, the central support platform I is supported by a foundation pad 18 of reinforced concrete or the like situated upon the seabed $; if the seabed is soft, piles may be driven or conductor casings installed to support the weight of the platform. The exemplary embodiment of the present invention contemplates a ballastable central support platform, wherein the foundation and supporting columns have floatation cavities therein, for providing selective buoyancy means for transporting said platform as needed, or perhaps implimenting the system in an deep water area, where a seabed supported structure would lack economic feasibility. A ballastable system would also provide flexibility in site relocation, due to environmental or other conditions. Further, in deeper water situations, a concrete foundation may be dispensed with, and a conductor casing support, such as those implemented with hydrocarbon recovery production platforms or the like may be implemented.

Situated just above the high water W level mark is the mid level working deck 19, which is supported by columns 20 of reinforced concrete, steel or the like; if structural integrity permits, the columns 20 can be hollow, and accessible from the mid level deck, which would allow use therefore as storage space, such as, for example, granular fish feed, fresh water, diesel fuel, floatation cells (as discussed above) or even fingerling tanks or the like. One of the pillars could form an underwater monitoring/observation area, and thereby include windows to allow personnel to view the fish, machinery, or divers at work.

The working deck is situated so as to allow easy access, maintenance, and control of the cages 5, 6, and may also include smaller, inner platform suspended cages, which may be used for holding and grading fish, for transferring and inspection of fish between cages, or to grow fingerlings. The suspended cages may be maneuvered up or down by an electric wench, which would be attached to a moving overhead crane attached to a round rail/track connected to the underside of the top level floor.

The upper level deck 22 is spaced above the mid level deck via columns 21, supporting the upper level deck substantially above mean water level, thereby preventing water damage to the upper level even during heavy weather.

Situated on the upper level deck is a geodesic dome 23 structure, which is contemplated as being water tight and formed of a strong material such as metal or the like. In the exemplary embodiment, the dome would have around, for example, 5000 feet of usable space, and three floors, with an observation room on top. The first floor could house a mechanical system/physical plant, and a research laboratory for the research staff. The second floor would house living quarters for the crew, a galley, and guest quarters. The third floor would support an instructional facility, and the top floor would support an observational facility, which would provide the nerve center of the operation.

Also supported on the upper level deck are cranes 2, as earlier identified in the discussion of FIG. 1. In order to provide maximum lifting performance, each of the cranes is situated upon and thereby supported directly by upper level support columns 21, which in turn are supported by columns 20 supporting the middle, working level, as discussed above. The cranes service the working platform and top level, and are used to maintain the barrel cages, to load supplies, fish food and service the vessels that dock; further uses of the cranes are addressed in the discussion of FIG. 2b.

Figure 2A:
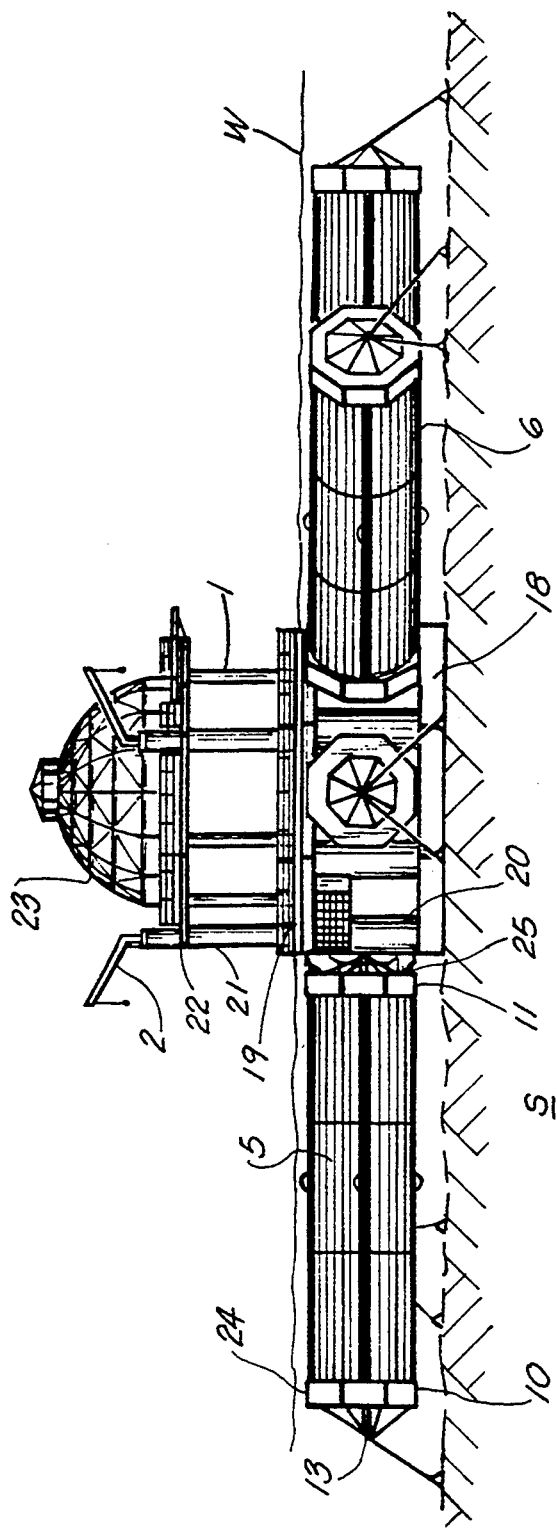
FIGS. 2a and 2b represent side views of the invention of FIG. 1, illustrating the central support platform resting on the seabed.

As shown in FIG. 2a, the central support platform I has dispersed about it in two main arrays of generally laterally situated, submerged cages, the arrays having a spaced area therebetween for docking facilities. In addition to the features discussed in the recitation of FIG. 1, each of the cages has further provided therein, as is illustrated in FIG. 2, first 24 and second 25, generally taurus configured ballast/floatation tanks adjacent to the outer 10 and inner 11 ends of the cages, respectively. These ballast/floatation tanks allow the operators of the system to selectively float the cages on the surface for cleaning, provide a slight buoyancy and be tethered in mid water (or slightly negative buoyancy and be cable supported in mid water), or provide a negative buoyancy to sink the cages to the sea floor, in order to protect them in heavy weather. As shown, in the exemplary embodiment of the present invention, the cages are, for example, about forty feet in diameter, and the water is about fifty feet in depth, so sinking the cages to the sea bottom would only entail the upper level being about ten feet below the surface. Of course, in deeper water, the cages would be even deeper, and deeper water could also therefore support larger diameter cages.

Figure 2B:
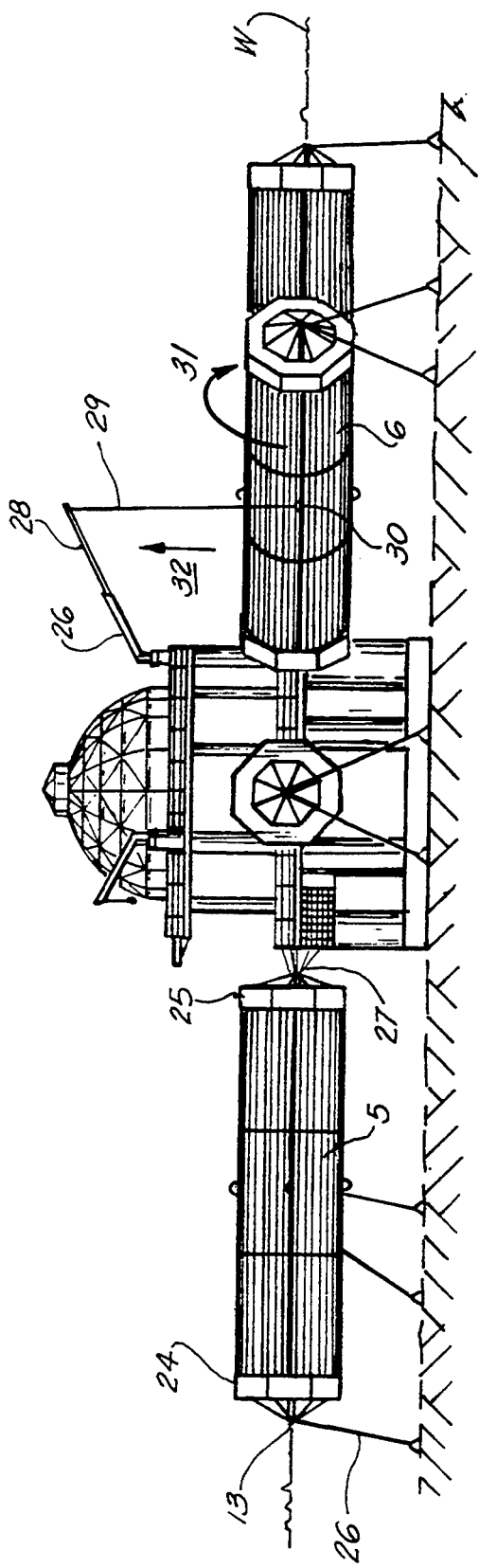
Figure 3:
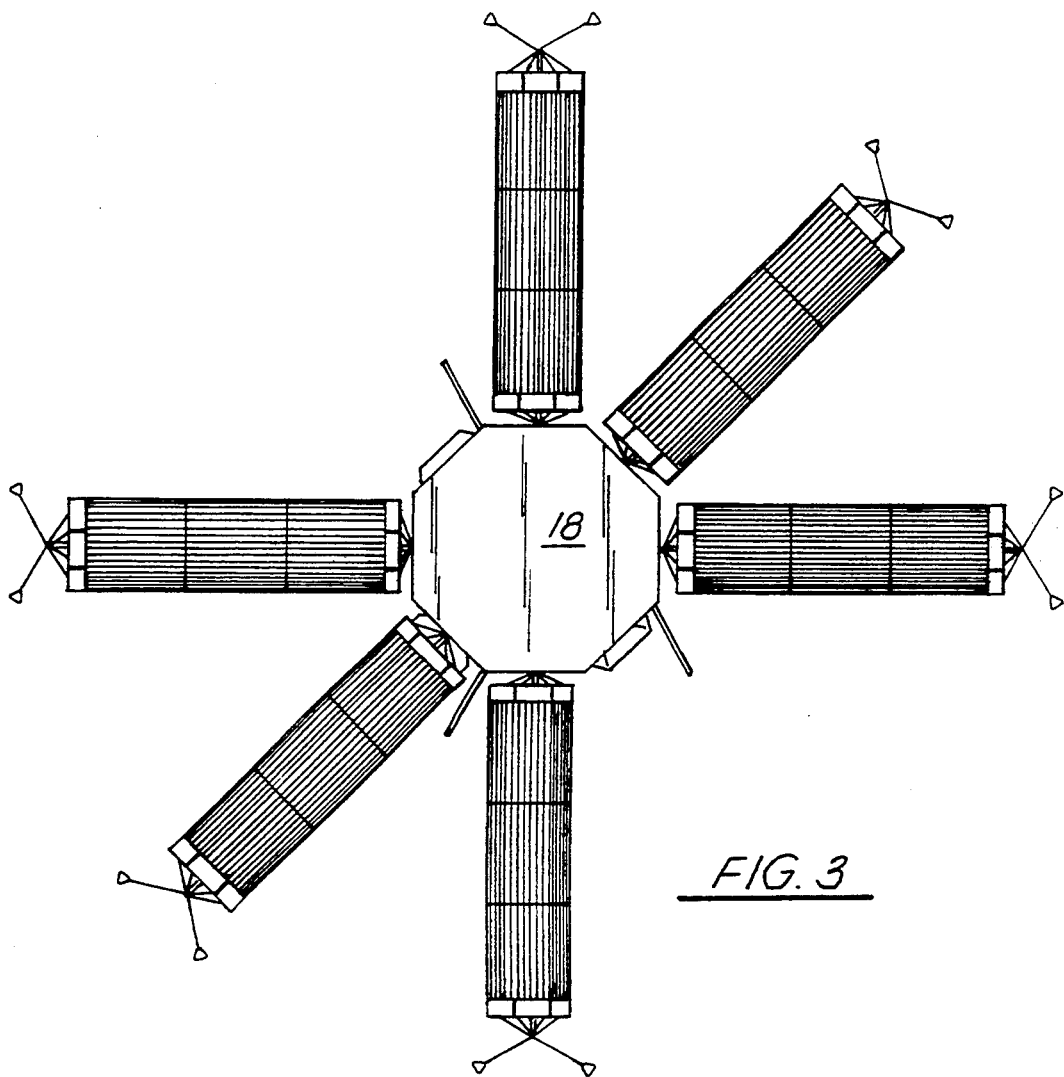
FIG. 3 is a bottom view of the invention of FIG. 1, illustrating the underside of the central support platform.
Figure 4:
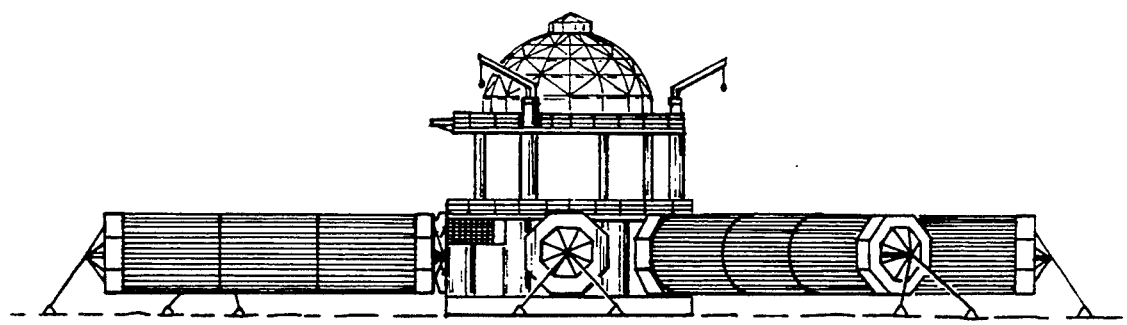
FIG. 4 is a rear view of the invention of FIG. 1, illustrating the dome structure and platform levels.

FIG. 2b illustrates the cages 5, 6 in their floating, maintenance and harvesting position upon the water W. In order to raise the cages, the water ballast is blown out of the ballast tanks by pumping water into same through ballast control lines from the support platform; the lines controlling the outer tank passes through the service pipe, which forms a conduit for most of the various control and maintenance systems of the cages.

A relief valve blows the water out of the tanks, creating positive buoyancy; a loosening of the anchor lines 26 (or tightening of support lines 27), and the cages rise about halfway above the water surface. From the working level platform, the worker can easily climb upon the service pipe 33, which runs the length of the longitudinal axis of the cage, having a walkway thereon, and is just above the water level when the cage is in the floating position. As noted supra, the service pipe may be sealed so as to form a flotation cell for the barrel cage in which it is disposed, assisting in lifting the service pipe and walkway out of the water. Access the walkway is important, as it allows the worker to monitor the fish crop and perform maintenance and other operations inside the cages.

One such maintenance duty is cleaning of the cages, which can tend to collect plant life such as algae and the like thereon. While the algae can be sprayed off with high pressure hoses, one preferred method (and less intrusive on the fish) is simply to expose the cage walls to ultraviolet radiation from the sun, which kills the algae in short time.

When one side of the cage has been exposed adequately, the cage may be rotated by extending the boom 28 of the crane 2b over the cage to be rotated, affixing the cable 29 to a padeye 30 located on the side (or bottom) of the cage, and applying upward force 32, thereby rotating 31 the cage, exposing a submerged portion of the cage wall for algae removal. This rotational operation may also be accomplished by selectively ballasting compartments in the ballast tanks 24, 25, in order to accomplish the roll. Similarly, the operation could be used to lift the tanks if the ballast tanks ceased to function, or in a version of the invention without ballast tanks.

Figure 5:
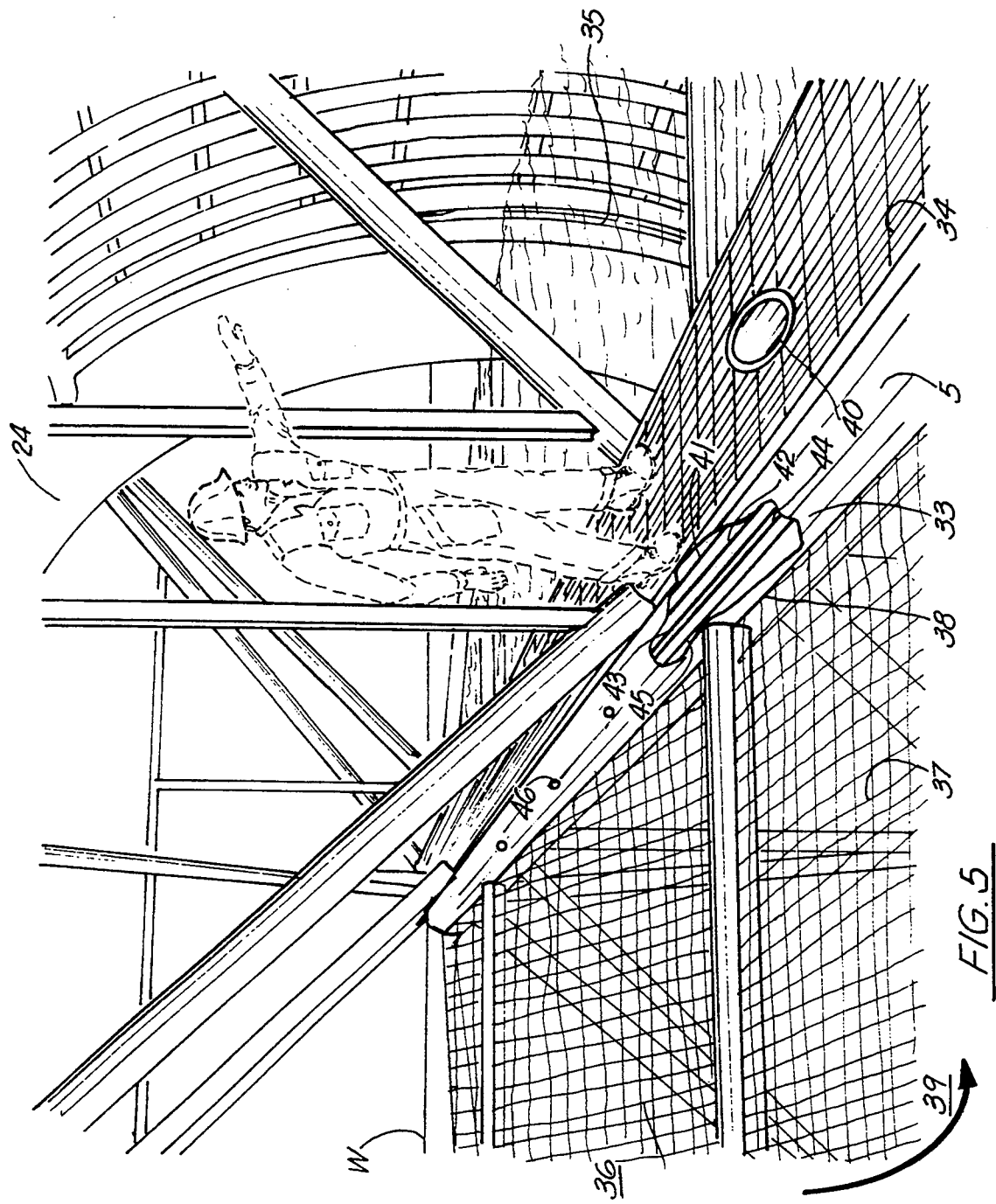
FIG. 5 is an inside view of the a barrel cage as shown in the invention of FIG. 1, illustrating the service pipe situated generally along the longitudinal axis of a barrel cage, and the placement and configuration of the harvesting net.
Figure 6:
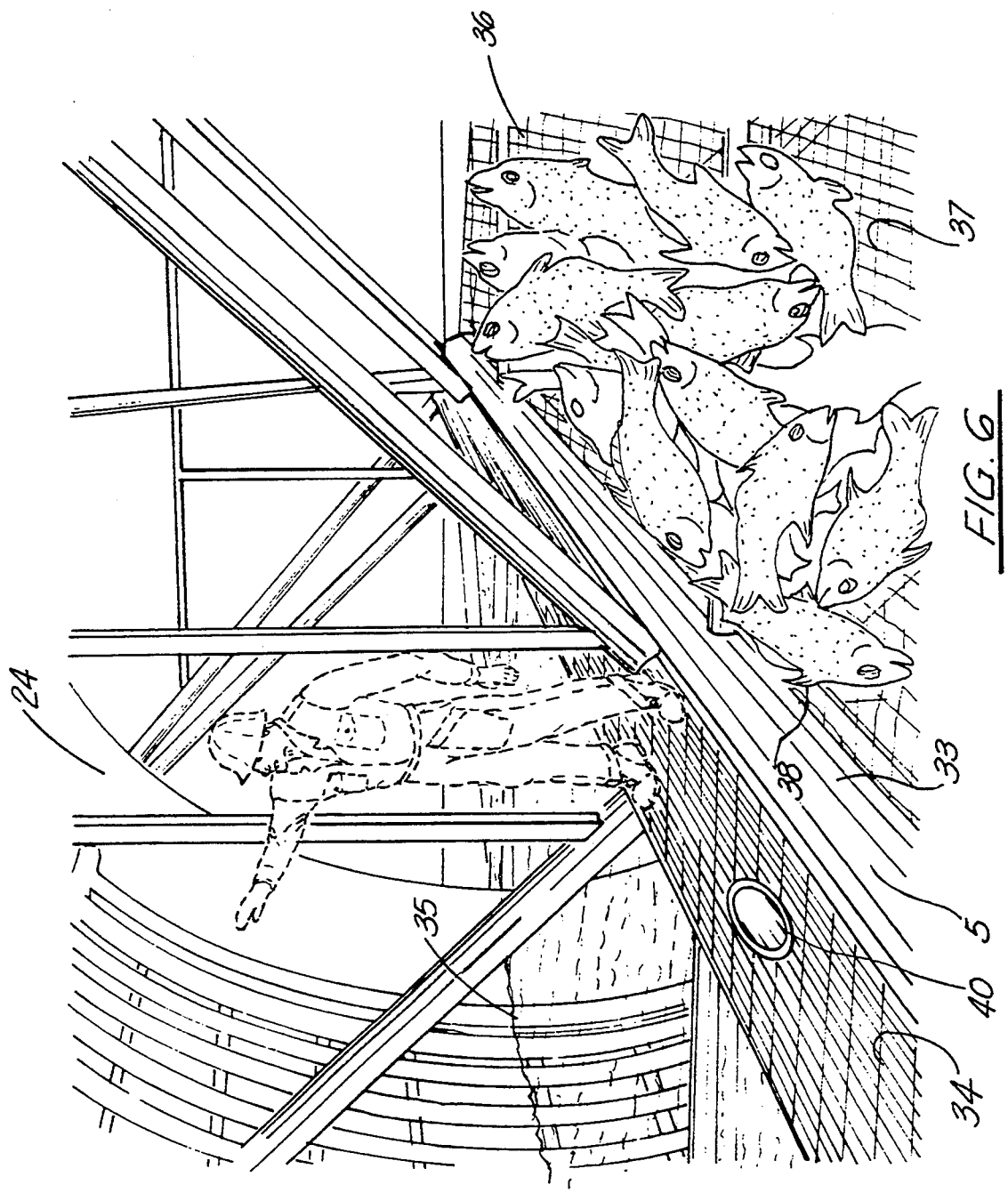
FIG. 6 is an inside view of the barrel cages as shown in the invention of FIG. 1, illustrating the rotation of the cage and deployed harvesting net, harvesting the contents of said cage.

FIG. 5 illustrates a view of a cage floating upon the surface of the water, looking at its outer end from the service pipe 33, standing upon the walkway 34. As shown, the service pipe and walkway are supported just above the water line W, with the service pipe splitting the water surface in two equal portion sides 35, 36 within the cage. Also shown are various support beams and the like which may be accessed and maintained from this vantage point.

The service pipe not only supports the walkway, it also contains feeding lines 43 for automated dispensing of feed to the fish from the storage bin on the support platform, which feed is dispensed via outlets 46 emanating from the service pipe at spaced intervals along said pipe. Additionally, an oxygenation diffuser 42 for blowing air into the cages, oxygenating the water, may be provided via the service pipe, and controlled via the support platform. Also provided is the air line 41 utilized for blowing the ballast tanks 24, as well as control means 44 for filling the ballast tanks as desired.

Still another component of the present system which may be stored in the service pipe 33 is a harvest seine or net 37, which may be dispensed from a roller located in a compartment 38 on one side of the service pipe, allowing the net 37 to be rolled out from the service pipe to the opposing cage wall. The net is only dispensed along one side of the cage, to be used in harvesting fish from the tanks, as will be shown.

As indicated, the net 37 is installed fully between one side of the service pipe and the opposing cage wall; this installation may be done manually, or it may be rolled from the compartment 38 in the service pipe, which can be done by hand or via automated mechanism. Once the net is secured, the personnel leave the cage, and said cage is rotated 39 in a manner as described above, 180 degrees, in effect passing the net through the water and removing the fish from the water.

Once the net has turned with the rotation of the cage, the fish are lifted from the water and exposed. The harvest net can be of any fluid permeable material which quickly allows the passage of water therethrough, and a slippery material such a vinyl or the like attached to the net near the pipe could further enhance recovery, as an additional rotation of about 15–20 degrees would slide the fish toward the vinyl liner near the service pipe like a slew, where the collected species could be collected via conveyor, or, as is proposed in the exemplary embodiment, suction apparatus, such as the INNOVAC system, via vacuum line 45 which could be operated by the personnel from the walkway, and from which suction hoses could be plugged in to vacuum ports 40.

The fish may be graded and transferred to another cage, or they may be ready for harvesting and transferred to the support platform or a waiting vessel. It is noted that, in an alternative system, the vacuum system may be able to be reversed to provide air pressure for blowing the ballast tanks, as opposed to the present contemplated separate line system running through the service pipe, thereby reducing the need for a separate fluid flow line. Further, the vacuum system may be utilized for transferring fingerlings from the hatchery on the central support platform to the desired cages; a series of butterfly valves or the like could be utilized to direct the fish to the desired tanks, or from one tank to another, as necessary.

Further, an alternative system may contemplate that the suction system may also be utilized, in reverse mode, for oxygenation of the water (although the present system contemplates a separate diffusion system piping air through the service pipe) and even feeding of the fish, sucking fish food pellets from the storage area and depositing it at the desired cage. Thus, in an alternative system, the suction system may provide several necessary features of the present system, dispensing with the necessity of redundant fish recovery vacuum pipes, fish feed pipes, oxygenation pipes, and ballast blow pipes; a single vacuum system could provide all of these features, with standardized valving, provided that the system must allow for reverse flow, and carry liquid as well as gaseous fluid and small granular objects as well as fingerlings or freys and larger fish, up to five pounds or perhaps more.

Lastly, as mentioned infra, the present system may utilize in the alternative to a custom fabricated central support platform, an abandoned offshore production platform or like structure. With some retrofitting, such a structure could perform as well as the present system, but at a cost savings and big ecological benefit. In such a scenario, the platform would be stripped of all hydrocarbon processing machinery, be degreased, and painted with an anti-fouling paint.

In the preferred embodiment of the present system, separate vacuum systems, oxygenation systems, feed conveyor tubes, and ballast tank lines for blowing the ballast tanks would be installed such that the lines of which would run through the service pipe from the support platform, where the cage functions would be monitored and controlled.

Figure 7:
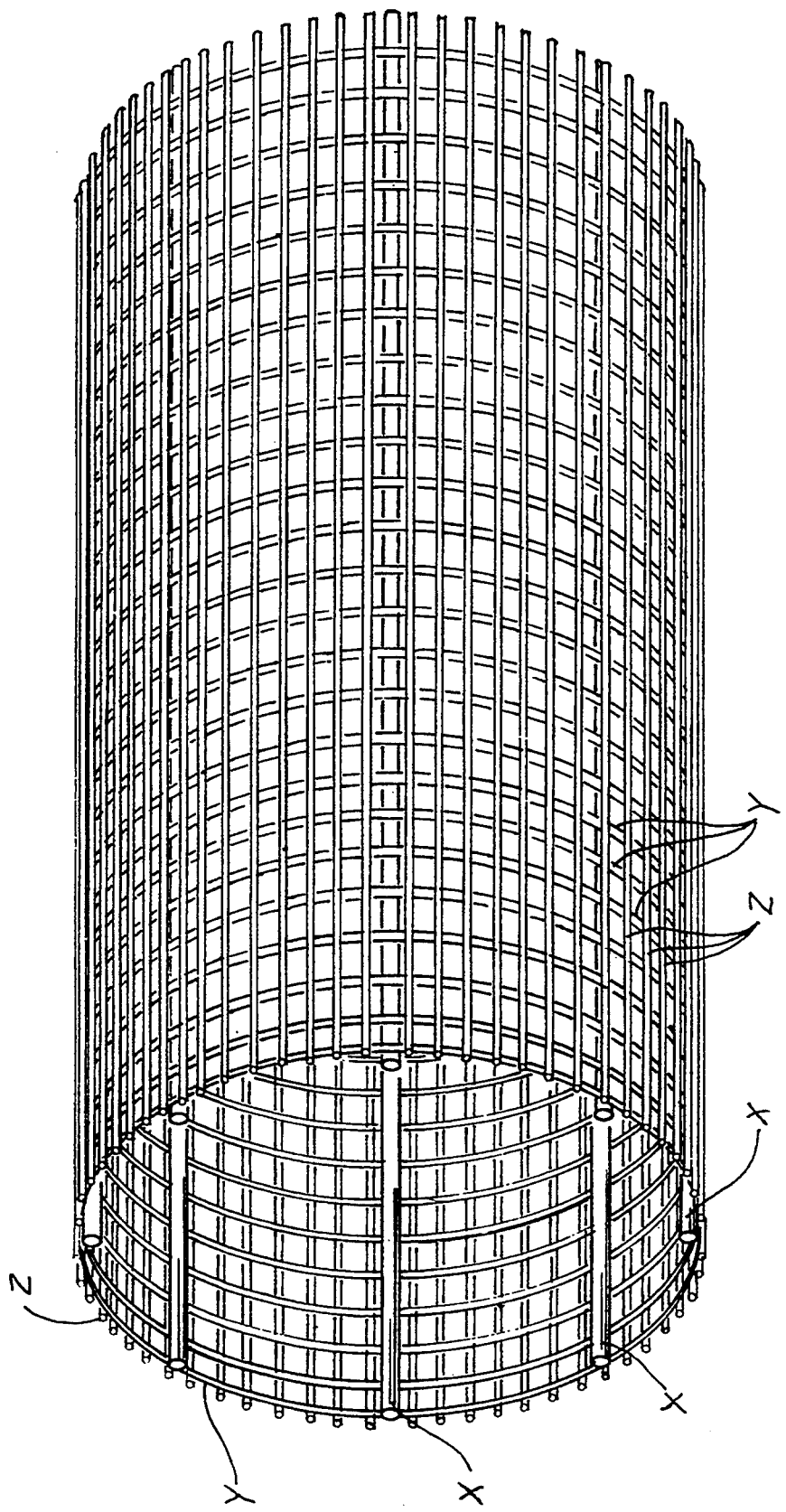
FIG. 7 is an exterior, isometric view of an exemplary cage wall construction of the cage of the present system, illustrating the utilization of a helical or spirally-wrapped member of, for example, tubing or the like for providing a lower cost, stronger cage construction.

Lastly, FIG. 7 describes with particularity an alternative feature to the barrel cage construction of the present invention, wherein there is provided a single helical or spirally situated length of tubing Y of PVC or the like enveloping the longitudinal stringers Z of the cage, whereupon there would be situated crossbars Z for providing the cage enclosure. Also, a net may be placed over or sandwhiched within the stringers Z and the tubing Y for further preventing egress of the crop, or the engress of predators therein. The tubing Y may also be sealed to provide additional floatation means for the system, or it may be ballastable via the selective flooding thereof.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. An open water mariculture facility for raising a marine species in a body of water having a seabed, comprising:
    a central support platform Capable of resting upon the seabed, said platform further comprising an upper level deck above the high water mark of the open water, said central support platform having first and second sides;
    first and second arrays of elongated cages laterally emanating from said first and second sides of said central support platform, each of said cages having first, inner and second, outer ends, and side walls therebetween, said first, inner ends of said cages situated near said central support platform, said first, inner ends of said cages in each array situated in closer proximity to each other than said second ends of said cages, each of said ends having ballast tanks for raising or lowering each of said cages under the water or about halfway out of the water independently of one another, and rotating means for independently rotating each of said cages as desired.

2. The mariculture facility of claim 1, wherein said water has a prevailing current, and said cage arrays are situated in a generally lateral position relative to said prevailing current and said side walls of said cages forming said arrays, to allow for maximum water circulation through said cages.

3. The mariculture facility of claim 2, wherein said upper level deck on said central support platform further comprises a first vessel docking area situated near said first and second cage arrays.

4. The mariculture facility of claim 3, wherein said upper level deck on said central support platform further comprises a second vessel docking area located on said upper level deck on a side opposite to said first vessel docking area, said second vessel docking area situated near said first and second cage arrays.

5. The mariculture facility of claim 1, wherein said water has a prevailing current, and said cage arrays are situated in a generally longitudinal position relative to said prevailing current and said side walls of said cages forming said arrays, thereby minimalizing interference with the prevailing current flow, thereby providing a stronger, more stable system during high current flow.

6. The mariculture facility of claim 1, wherein each of said cages further comprises a service pipe situated along the longitudinal axis of said cages, said service pipe affixed to said first and second ends of said cages, said service pipe having first and second ends and first and second sides, said first and second ends having affixed thereto anchor lines for anchoring said cages in place.

7. The mariculture facility of claim 6, wherein said service pipe has situated thereon a walkway.

8. The mariculture facility of claim 6, wherein said each of said cages has a containment area between said first and second ends, said containment area having inner side walls, and said service pipe has affixed on said first side of said service pipe a net running about the length of said service pipe, said net attachable to one of said inner side walls of said containment area opposite said first side of said service pipe.

9. The mariculture facility of claim 8, Wherein said first side wall of said service pipe has a net storage compartment formed therein generally along the length of said service pipe, said net storage compartment configured to provide storage and dispensing of the net.

10. The mariculture facility of claim 6, wherein said service pipe has situated therein a ballast control line for providing pressurized air to said ballast tanks, to force water from said tanks on demand.

11. The mariculture facility of claim 6, wherein said service pipe has situated therein aeration lines for aerating said cage.

12. The mariculture facility of claim 6, wherein said service pipe further contains a feeder tube for conveying fish food from said central support platform to said cage on demand, said feeder tube communicating with a plurality of feeder dispenser tubes emanating from said service pipe along predesignated lengths along said service pipe.

13. The mariculture facility of claim 6, wherein said service tube further contains suction means to remove fish from said cage.

14. The mariculture facility of claim 1, wherein said cages further comprise padeyes affixed to said side walls, and wherein said rotating means for said cages further comprises a crane situated on said upper level of said support platform, said crane having a cable dispensed therefrom, said cable affixed to one of said pad eyes of the cage to be rotated.

15. The mariculture facility of claim 1, wherein said ballast tanks are compartmented, and said rotation means further comprises means to selectively ballast and deballast each of said compartments of said ballast tanks on demand.

16. The mariculture facility of claim 1, wherein said central support platform is an retrofitted, abandoned hydrocarbon recovery or processing platform.

17. The mariculture facility of claim 1, wherein said cages have a diameter 80-90 percent of the depth of the body of water which they are situated.

18. The mariculture facility of claim 1, wherein said support platform is ballastable.

19. The mariculture facility of claim 1, wherein said cage side walls are formed of a plurality of longitudinally aligned stringers having spirally wrapped therearound, to form a generally cylinder configured containment area, a single length of tubing.

20. A method of open water mariculture for raising a marine species in a body of water having a seabed, comprising the steps of:
(a) providing a facility comprising:
a central support platform resting upon the seabed, said platform further comprising an upper level deck above the high water mark of the open water, said central support platform having first and second sides;
first and second arrays of elongated cages laterally emanating from said first and second sides of said central support platform, each of said cages having first, inner and second, outer ends, and side walls therebetween forming a containment area having inner side walls, said containment area situated underwater, and containing said marine species, said first, inner ends of said cages situated near said central support platform, each of said ends of said cages having ballast tanks for independently lowering each of said cages under the water or raising said cages about halfway out of the water independent of one another, and rotating means for independently rotating each of said cages as desired;
a service pipe situated along the longitudinal axis of each of said elongated cages forming said first and second cage arrays, said service pipe affixed to said first and second ends of said cages, said service pipe having first and second ends and first and second sides, said first and second ends having affixed thereto anchor lines for anchoring said cages in place;
a net affixed to said first side of said service pipe, said net running about the Length of said service pipe;
b. selecting a cage having marine species therein to be harvested;
c. applying pressurized air to said ballast tanks of said cage to be harvested, providing buoyancy to said cage and lifting said cage about halfway out of the water;
d. taking said net affixed to said first side of said service pipe, and affixing it to one of said inner side walls of said cage opposite said first side of said service pipe, so that said net runs from said first side of said service pipe to said inner side wall opposite said first side of said service pipe;
e. rotating said cage 180 degrees, such that said net passes through the water, lifting said marine species from the water, and supported by said net; and
f. removing said marine species from said net.

21. The method of claim 20, wherein step "a" has further included the step of providing a net storage compartment formed in said first side wall of said service pipe, generally along the length of said service pipe, said net storage compartment configured to provide storage and dispensing of the net, and step "d" has further included the step of removing said net from said storage compartment.

22. The method of claim 20, wherein step "f" has further included the step of vacuuming said marine species from said net.

23. The method of claim 20, wherein said rotating means for said cage of step "e" is accomplished by placing padeyes on the medial area of the side walls of said cages, providing cranes upon said upper level of said support platform, and affixing a cable from one of said cranes upon a pad eye on the cage to be rotate, and lifting said cable, lifting said padeye, and rotating said cage.

24. The method of claim 20, wherein there is further incorporated in step "a" the additional step of retrofitting an abandoned offshore platform to form said central support platform.

* * * * *